(12) United States Patent
Freund et al.

(10) Patent No.: US 6,504,538 B1
(45) Date of Patent: Jan. 7, 2003

(54) METHOD AND SYSTEM FOR GENERATING LIGHT VALUES FOR A SET OF VERTICES

(75) Inventors: Jason L. Freund, Sunnyvale, CA (US); Radomir Mech, Mountain View, CA (US); Zahid S. Hussain, San Jose, CA (US); Gianpaolo F. Tommasi, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/346,641

(22) Filed: Jul. 1, 1999

(51) Int. Cl.$^7$ .............................................. G06T 15/60
(52) U.S. Cl. ...................................................... 345/426
(58) Field of Search ......................................... 345/426

(56) References Cited

U.S. PATENT DOCUMENTS

| | | | | |
|---|---|---|---|---|
| 5,369,737 A | * | 11/1994 | Gholizadeh et al. | 395/126 |
| 6,014,144 A | * | 1/2000 | Nelson et al. | 345/426 |
| 6,078,332 A | * | 6/2000 | Ohazama | 345/426 |
| 6,175,367 B1 | * | 1/2001 | Parikh et al. | 345/426 |
| 6,226,006 B1 | * | 5/2001 | Collodi | 345/426 |
| 6,226,007 B1 | * | 5/2001 | Brown | 345/426 |

* cited by examiner

Primary Examiner—Mark Zimmerman
Assistant Examiner—Enrique L Santiago
(74) Attorney, Agent, or Firm—Woodcock Washburn LLP

(57) ABSTRACT

A method for generating light values for a set of vertices is disclosed. A set of vertices describing a geometric object is received. Each vertex has a coordinate and is associated with one or more vectors for evaluating a light value. Then, a vertex is selected from the set of vertices for computing a light value at the selected vertex. The light value at the selected vertex is associated with a light source having a coordinate. A selected vector for the selected vertex is then scaled by an inverse magnitude value of a corresponding vector that is associated with a neighboring vertex. The selected vector is scaled to generate an approximately normalized vector. The light value is then evaluated at the selected vertex using the approximately normalized vector such that an accurate normalized vector need not be computed for the selected vertex.

22 Claims, 9 Drawing Sheets

METHOD AND SYSTEM FOR GENERATING LIGHT VALUES FOR A SET OF VERTICES

BACKGROUND OF THE INVENTION

1. Field of the Invention

This invention relates generally to computer graphics and, more particularly, to a method for generating light values for a set of vertices.

2. Description of the Related Art

One of the principal goals of computer graphics is the rendering of realistic images (e.g., two- or three-dimensional images). Rendering images of real or imaginary objects typically involves generating geometric models (e.g., polygonal surfaces) of the objects and applying lighting effects to them. In computer graphics, surfaces of an object are generally modeled by a set of vertices that define graphics primitives such as polygons, edges, and/or vertices. These vertices may be produced from a variety of sources such as an application, tesselated NURBS surfaces, spheres, cones, etc. The vertices may be connected by edges and a sequence of edges or vertices may define one or more polygons.

Among others, rendering of realistic 3D graphics requires accurate and efficient modeling of 3D surfaces based upon the position, orientation, and characteristics of the surfaces and the light sources illuminating them. In particular, the interaction between lights and surfaces must be accurately modeled for rendering. Conventional computer graphics systems have implemented various illumination techniques to generate light values at individual pixels using an illumination or lighting model. For example, conventional lighting models typically model one or more lighting effects such as ambient light, diffuse reflection, and specular reflection, which are well known in the art. The ambient light effect accounts for a lighting effect resulting from multiple reflections of light from the surfaces present in a scene. The diffuse reflection accounts for reflection of light from a surface, especially a dull, matte surface while the specular reflection accounts for reflection of light off a shiny surface.

FIG. 1 illustrates a schematic diagram of vectors N, L, and H typically used in conventional illumination models. Vector L is a light direction vector pointing from a point P on a surface 100 to a light source, such as a light bulb. Vector N is the outward surface normal vector at point P. View vector V is a vector pointing from point P to a viewer. Vector H is a half-angle vector bisecting the angle formed by the light vector L and the eye vector V. The angle between the vectors N and H is defined as angle θ. The vectors L and H are referred to herein as light vectors. Since the half-angle vector H is essentially a sum of the vectors L and V, it is also known as sum vector S.

In diffuse reflection modeling, the reflected light from the surface point P falls off approximately uniformly as a function of an angle between the vectors N and L. The diffuse light fall-off in the diffuse reflection model is typically modeled by using a dot product term N·L. In specular reflection modeling, on the other hand, the light reflected from surface point P is modeled as falling off exponentially as seen from a direction of view vector V. The fall-off is generally modeled by a dot product term $(N \cdot H)^s$ where s is a surface material's specular-reflection coefficient.

The ambient, diffuse, and specular models are well known and are described in greater detail in *Computer Graphics: Principles and Practice* by James D. Foley et al., Addison-Wesley (1996), ISBN 0-201-84840-6, which is incorporated herein by reference and constitutes a portion of the background against which the present invention was developed. Additionally, the OpenGL™ (versions 1.1 and 1.2) application programming interface (API) describes a particular lighting model that includes effects like spotlighting, diffuse light reflection, specular light reflection, and related parameters for implementing a model. The OpenGL™ (versions 1.1 and 1.2) graphics application programming interface is commercially available from SGI, also known as Silicon Graphics, Inc., the assignee of the present application, and is incorporated herein by reference.

Conventional methods typically evaluate light color values at the vertices of primitives by computing the diffuse and specular term dot products. For example, the OpenGL™ graphics application programming interface, version 1.1 determines a vertex color C by evaluating the lighting equation for each light source i as follows:

$$C = emission_{material} + ambient_{light\_model} * ambient_{material} + \qquad \text{Eq. (1)}$$
$$\sum_{i=0}^{n-1} \left( \frac{1}{k_c + k_l d + k_q d^2} \right)_i * (spotlighteffect)_i *$$
$$[ambient_{light} * ambient_{material} +$$
$$(\max\{L \cdot N, 0\}) * diffuse_{light} * diffuse_{material} +$$
$$(\max\{H \cdot N, 0\})^{shininess} * specular_{light} * specular_{material}]i$$

In Equation (1), the term $1/[k_c + k_l d + k_q d^2]$ is also referred to as "attenuation factor," where d is the distance between the position of a light source i and the vertex, $k_c$ represents constant attenuation, $k_l$ is linear attenuation, and $k_q$ represents quadratic attenuation. Those skilled in the art will recognize that Equation (1) may be evaluated for each light source i (e.g., local light source) illuminating a given vertex of a primitive.

It should be appreciated that Equation (1) may also be applied to a given pixel to compute a color value for the pixel. However, applying such equation to individual pixels in a primitive is typically prohibitively expensive in terms of cost and time. Hence, most conventional methods implement well known shading methods such as Gouraud shading and Phong illumination techniques to generate the color values for the individual pixels within the primitive. However, other illumination techniques are described in U.S. patent application Ser. No. 08/839,035, filed Apr. 23, 1997, entitled "A Method and System for Real Time Illumination of Computer Generated Images," by Vimal Parikh et al. In addition, U.S. Pat. No. 5,659,671 entitled "Method and Apparatus for Shading Graphical Images in a Data Processing System," by Tannenbaum et al. also describes Phong lighting and shading methods. The disclosures of these references are incorporated herein by reference.

In implementing a light equation to evaluate light color values, conventional techniques have typically computed the light vectors L and H for each vertex in a polygon mesh describing a scene and for each light illuminating the vertex. Unfortunately, implementing conventional shading methods generally requires considerable computing resources to evaluate due to the complexity in evaluating the vectors in dot products N·L and (N·H) of the diffuse and specular terms. For example, conventional methods typically normalize (i.e., unitize) vectors N, L, and H for computing the dot products in a lighting equation such as Equation (1) described above. This is because the unit vectors are direction vectors having a magnitude of one. The dot product of two unit vectors allows determination of similarity in directions of the vectors. By way of example, the dot product of two normal vectors is equal to 1 when the vectors have the same direction and 0 when the vectors are perpendicular to each other.

However, the vector normalization is a costly process that requires numerous multiplication, addition, division, and inverse square root operations. For example, a unitized vector of L vector is evaluated by computing $L/|L| = L/[L \cdot L]^{1/2} = L/[Lx^2 + Ly^2 + Lz^2]^{1/2}$, where Lx, Ly, and Lz are x, y, z components of the vector L, respectively. Using the normalized vectors, the diffuse term is computed by evaluating the dot product $N \cdot L$. Likewise, the specular term is also determined using the normalized vectors by evaluating the dot product $N \cdot H$ raised to the shininess exponent, s. The diffuse and specular terms are then used in the above equation along with the other well-known variables to produce an intensity (e.g., light color) at a given pixel. Given that a polygon mesh may include hundreds or thousands of vertices, evaluating the diffuse and specular term vectors individually and independently at each of the vertices may be prohibitively costly and time consuming to implement in many computer graphics systems.

In view of the foregoing, what is needed is a method and system for efficiently evaluating the dot product terms in illumination models without computing the vectors in the dot product terms individually and independently for each of the vertices.

SUMMARY OF THE INVENTION

Broadly speaking, the present invention fills these needs by providing a method and system for generating light values for a set of vertices. It should be appreciated that the present invention can be implemented in numerous ways, including as a process, an apparatus, a system, a device, a method, or a computer readable medium. Several inventive embodiments of the present invention are described below.

In one embodiment, the present invention provides a method for generating light values for a set of vertices. In this method, a set of vertices describing a geometric object to be rendered is received. Each vertex has a coordinate and is associated with one or more vectors for evaluating a light value. Then, a vertex is selected from the set of vertices for computing a light value at the selected vertex. The light value at the selected vertex is associated with a light source having a coordinate. A selected vector for the selected vertex is then scaled by an inverse magnitude value of a corresponding vector that is associated with a neighboring vertex. The selected vector is scaled to generate an approximately normalized vector for the selected vector. The light value is then evaluated at the selected vertex using the approximately normalized vector such that an accurate normalized vector need not be computed for the selected vertex. In a preferred embodiment, the vectors are light vector L and/or half-angle vector H that are used in diffuse and specular terms of illumination models, respectively.

In another embodiment, a method is provided for generating a normalized vector for a first vector at a given position based on a second vector at a neighboring position. The method includes: (a) determining an inverse-magnitude of the second vector; (b) scaling the first vector for the given position by the inverse-magnitude of the second vector to generate an approximately normalized vector A for the first vector; (c) determining an acceptable error range for the approximately normalized vector A; (d) determining whether the approximately normalized vector A is within the acceptable error range; (e) if the approximately normalized vector A is within the acceptable error range, using the approximately normalized vector A as the normalized vector for the first vector; and (f) if the approximately normalized vector A is not within the acceptable error range, evaluating an accurate normalized vector and using the accurate normalized vector as the normalized vector for the first vector.

By thus using the scaling the selected vector with an inverse-magnitude of a vector associated with a neighboring vertex, the present invention generates an approximately normalized vector for evaluating the light value at the selected vertex. The determination of the approximately normalized vector leads to substantial savings in time and resources that otherwise would be required to compute the accurate normalized vector at the selected vertex. Given that a model may contain hundreds or even thousands of vertices, the savings in resources and time may be significant. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form part of this specification, illustrate embodiments of the invention and, together with the description, serve to explain the principles of the invention.

DETAILED DESCRIPTION OF THE PREFERRED EMBODIMENTS

An invention is described for a method and system for generating light values for a set of vertices. It will be obvious to one skilled in the art, however, that the present invention may be practiced without some or all of the specific details set forth below. In other instances, well known process operations have not been described in detail to avoid unnecessarily obscuring the present invention.

Figure 1:
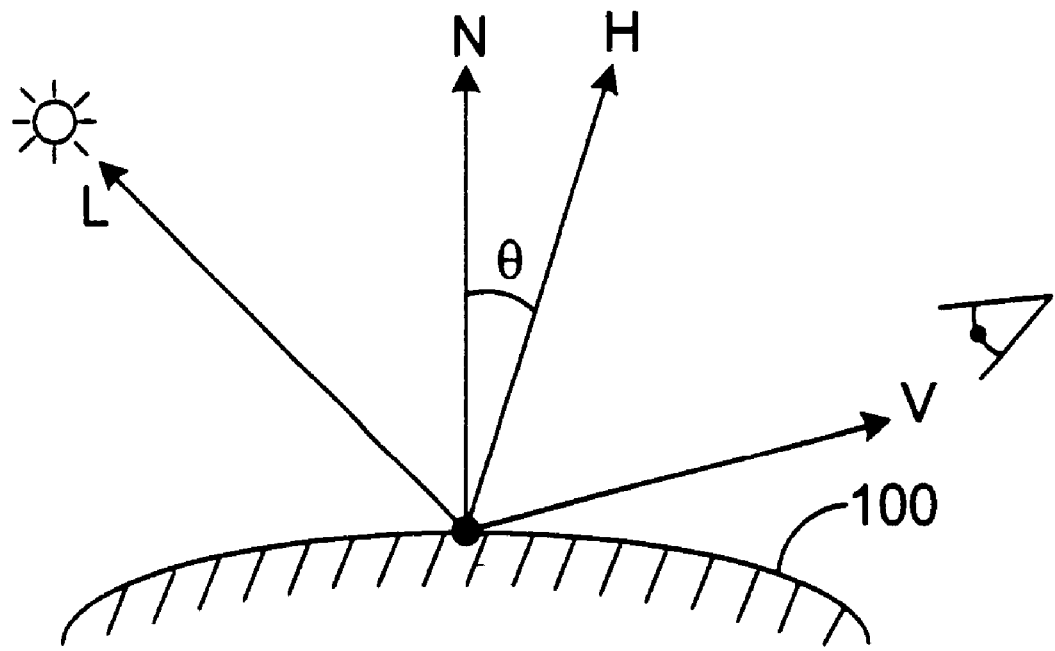
FIG. 1 illustrates a schematic diagram of vectors N, L, and H typically used in conventional illumination models.
Figure 2:
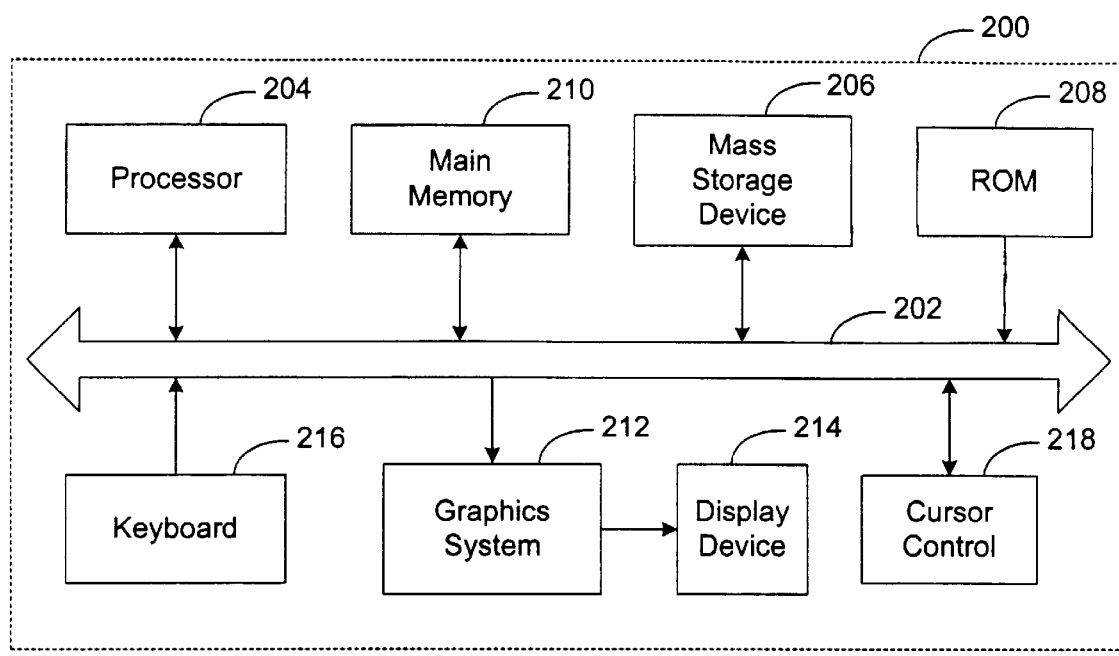
FIG. 2 illustrates a block diagram of an exemplary computer graphics system within which the present invention may be implemented or practiced.

FIG. 2 illustrates a block diagram of an exemplary computer graphics system 200 within which the present invention may be implemented or practiced. It should be borne in mind that the computer graphics system 200 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer graphics system 200 and are executed by processors therein.

The computer graphics system 200 may be any computer-controlled graphics system suitable for generating complex 2D or 3D images. The computer graphics system 200 includes a bus 202 for transmitting information between the various parts of the computer system. One or more processors 204 for processing information are coupled to the bus 202. The information, together with the instructions for processing the information, are stored in a hierarchical memory system comprised of a mass storage device 206, a read only memory (ROM) 208, and a main memory 210. The mass storage device 206 is used to store a vast amount of data and may include one or more hard disk drives, floppy disk drives, optical disk drives, tape drives, CD-ROM drives, or any number of other types of storage devices having media for storing data. The ROM 208 is used to store data on a permanent basis, such as instructions for the microprocessors. The main memory 210 is used for storing data on an intermediate basis. The main memory 210 may be DRAM, SDRAM, RDRAM, or any other suitable memory for storing data.

A graphics subsystem 212 may be included in the computer graphics system 200. The processor 204 provides the graphics subsystem 212 with graphics data, such as drawing commands and primitives including coordinate vertex data (e.g., pixel color, light vector L, surface normal vector N, view vector V, etc.), and other data related to an object's geometric position, color, texture, shading, and other surface parameters. A display device 214 is coupled to the graphics subsystem 212 to receive image data (e.g., pixel data) for display. Alternatively, the display device 214 may be coupled to the computer graphics system 200 via the bus 202. As used herein, the display device 214 includes any suitable device for display or recording graphics data.

Other devices may also be coupled to the computer graphics system 200. For example, an alphanumeric keyboard 216 may be used for entering commands and other information to processor 204 via the bus 202. Another type of user input device is cursor control device 218 (e.g., mouse, trackball, joystick, and touchpad) used for positioning a movable cursor and selecting objects on a computer screen.

The present invention provides a method and system that evaluate dot product terms in illumination models by re-using one or more dot product term vectors of a vertex to evaluate one or more dot product term vectors of neighboring vertices. In particular, the method and system of the present invention generates a first set of vectors (e.g., L and H) for illumination model dot products at a selected vertex. Then, an inverse magnitude of the vectors are re-used to generate a second set of dot product term vectors for a neighboring vertex if the vectors in the first and second sets are sufficiently similar to be within a predetermined acceptable error range. If the vectors are not sufficiently similar, then an accurate normalized vector is computed. In this case, however, a previously computed dot product value is used to save time and hardware resources. In this manner, the present invention substantially reduces processing complexities involved in evaluating dot product term vectors of illumination models.

Figure 3:
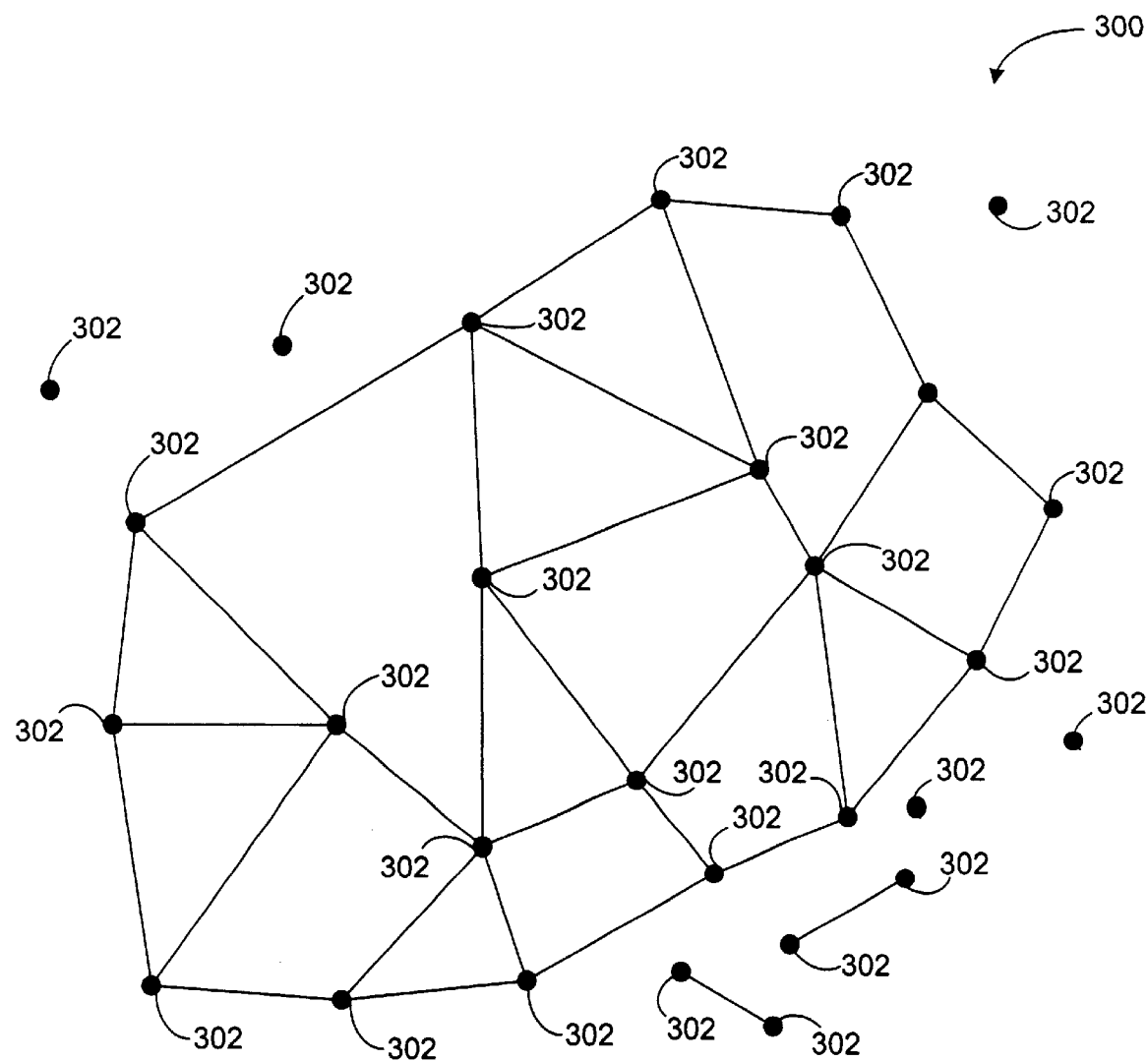
FIG. 3 illustrates a set of vertices that can define, for example, a polygonal mesh, polygon, points, or lines in accordance with one embodiment of the present invention.

In a preferred embodiment, the present invention evaluates light vectors for a vertex in a set of vertices based on light vectors of a neighboring vertex. FIG. 3 illustrates an exemplary set of vertices 300 that can define, for example, a polygonal mesh, polygons, points, or lines in accordance with one embodiment of the present invention. The set of vertices 300 includes a plurality of graphics primitives in the form of vertices 302. Each vertex is defined by a Cartesian coordinate (x, y, z). The vertices 302, in turn, may be used to further define other graphics primitives such as lines, polygons, etc. Although the present invention is illustrated using vertices, it should be borne in mind that the present invention is equally suitable for application to pixels or points for generating light values at the individual pixels or points.

In this arrangement, light vectors (e.g., L, H) are determined at one of the vertices 302. Then, the light vectors are used to evaluate the light vectors at the neighboring vertices 302 if the vectors are determined to be sufficiently similar to be within an acceptable range of error range. Further, the evaluated light vectors at the neighboring vertices can, in turn, be used to evaluate the light vectors for their neighboring vertices. Proceeding in this fashion, the light vectors may be determined for all the vertices 302 of the set of vertices 300 without independently computing the light vectors at each of the vertices 302.

In another embodiment, the methods of the present invention may be applied to individual pixels of graphics primitives such as polygons instead of the vertices. For example, light vectors at one pixel may be used to evaluate the light vectors at its neighboring pixels. In turn, vectors at the neighboring pixels may be used to determine the light vectors for other neighboring pixels.

Figure 4:
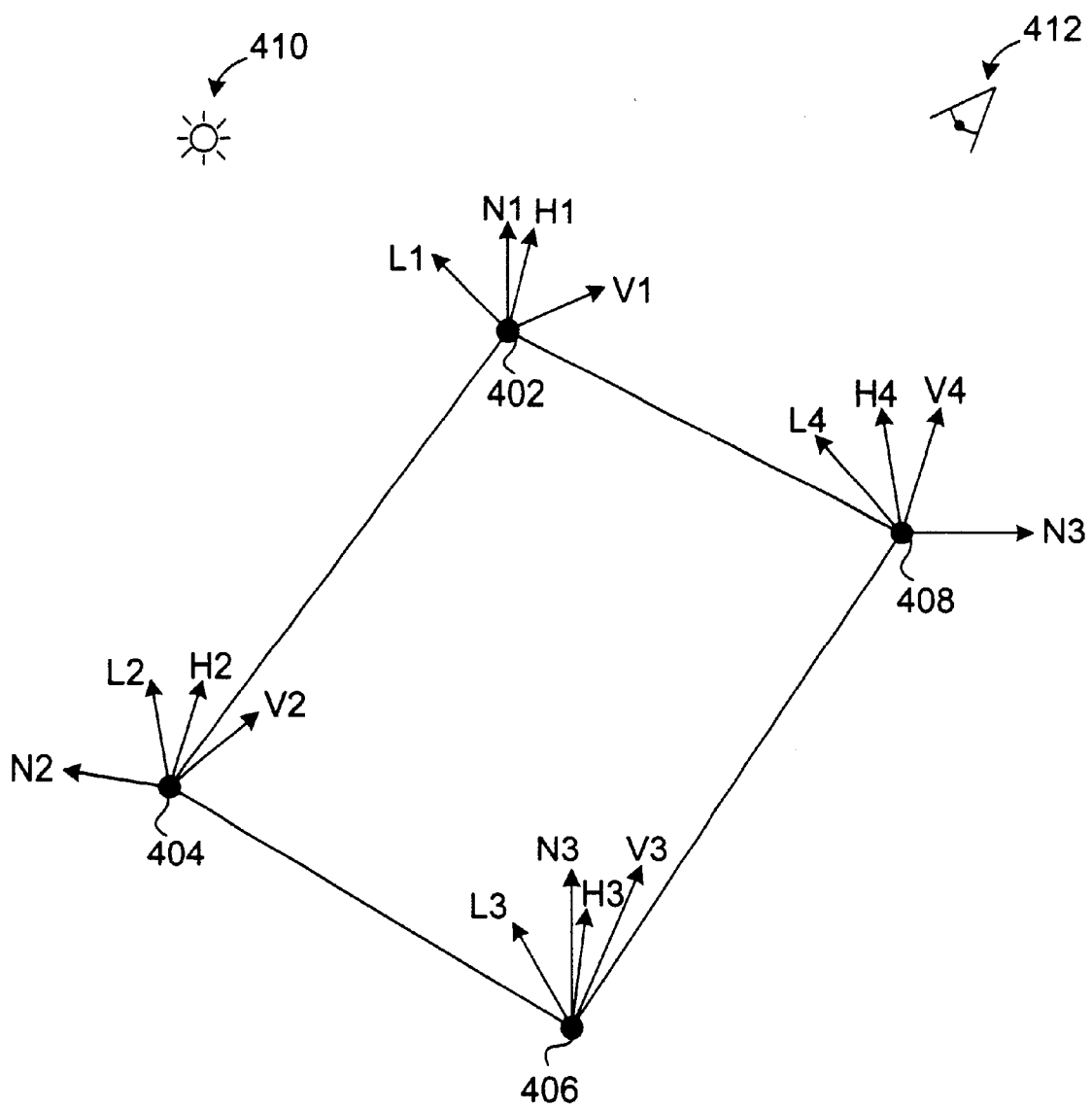
FIG. 4 illustrates a plurality of vertices and associated vectors in relation to a local light source and a viewer in accordance with one embodiment of the present invention.

FIG. 4 illustrates a plurality of vertices 402, 404, 406, and 408 and associated vectors in relation to a local light source 410 and a viewer 412 in accordance with one embodiment of the present invention. Each of the vertices 402 to 408 is associated with a light direction vector L, a surface normal vector N, a view vector V, and a half-angle vector H. For example, the vertex 402 is associated with a light direction vector L1, a surface normal vector N1, a view vector V1, and a half-angle vector H1. The light direction vectors L1, L2, L3, and L4 specifies directions toward the light source 410 at the vertices 402, 404, 406, and 408, respectively. On the other hand, the view vectors V1, V2, V3, and V4 defines direction toward the viewer 412 at the vertices 402, 404, 406, and 408, respectively.

In the preferred embodiment, the vertices 402, 404, 406, and 408 are traversed sequentially to compute the light vectors Ln and Hn of unit length for each of the vertices. For example, light vectors Ln1 and Hn1 of unit length are initially evaluated for the vertex 402 by computing inverse magnitude terms $1/|L1|$ and $1/|H1|$ and multiplying L1 and H1, respectively. If the corresponding vectors (e.g., L1 and L2 or H1 and H2) are sufficiently similar in magnitude (i.e., length), then the unitized light vectors Ln2 and Hn2 for the neighboring vertex 404 are computed by scaling L2 and H2 by the inverse magnitudes $1/|L1|$ and $1/|H1|$, respectively. This is described in more detail below.

Similarly, the light vectors L2 and H2 for the vertex 404 are used to compute the light vectors L3 and H3 of the neighboring vertex 406. Likewise, the light vectors L3 and H3 can be used to compute the light vectors L4 and H4 of the neighboring vertex 408. Alternatively, the light vectors for the vertex 408 may be computed from the light vectors of the vertex 402. The light vectors for vertices may also be computed in parallel by using two or more processors. For example, one processor may be used to evaluate the light vectors for the neighboring vertices 402 and 404 while another processor determines the light vectors for the neighboring vertices 406 and 408.

The present invention generates light vectors for each light source, preferably local light source, and for each vertex. The light vector V for local lights is computed when material and light properties permit a diffuse component to the light. For local lights and local viewer, the half-angle vector H is computed when light and material properties allow a specular component to the light. For each local light, the light vector L or at least the expensive inverse-magnitude used to normalize the vector L is re-used for nearby vertices. Similarly, for lighting models with a local viewer (i.e., viewer not at infinity), the half-angle vector H or at least its inverse-magnitude is re-used to compute the half-angle vector of nearby vertices.

Figure 5A:
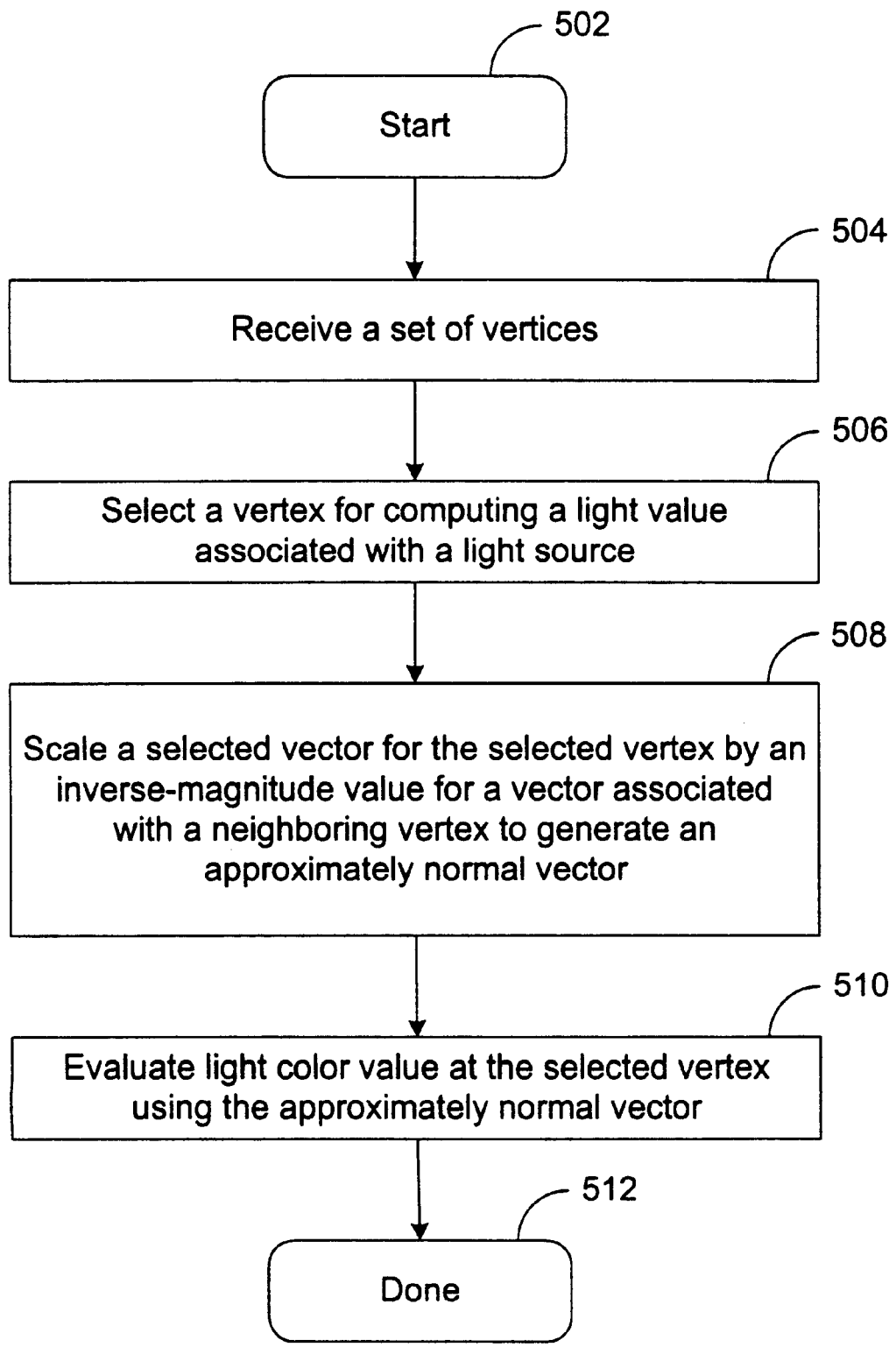
FIG. 5A illustrates a flowchart of an exemplary method for generating light values for vertices in accordance with one embodiment of the present invention.

FIG. 5A illustrates a flowchart of an exemplary method for generating light values for vertices in accordance with one embodiment of the present invention. In this method, a set of vertices is received in operation 504. Each vertex has a coordinate and is associated with one or more vectors for evaluating a light value. Then in operation 506, a vertex is selected from the set of vertices for computing a light value at the selected vertex. The light value at the selected vertex is associated with a light source having a coordinate. Next, a selected vector for the selected vertex is then scaled by an inverse magnitude value of a corresponding vector that is associated with a neighboring vertex. The selected vector is scaled to generate an approximately (e.g., substantially) normalized vector for the selected vector. Then in operation 510, the light value at the selected vertex is evaluated using the approximately normalized vector such that an accurate normalized vector need not be computed for the selected vertex. The method then terminates in operation 512.

Figure 5B:
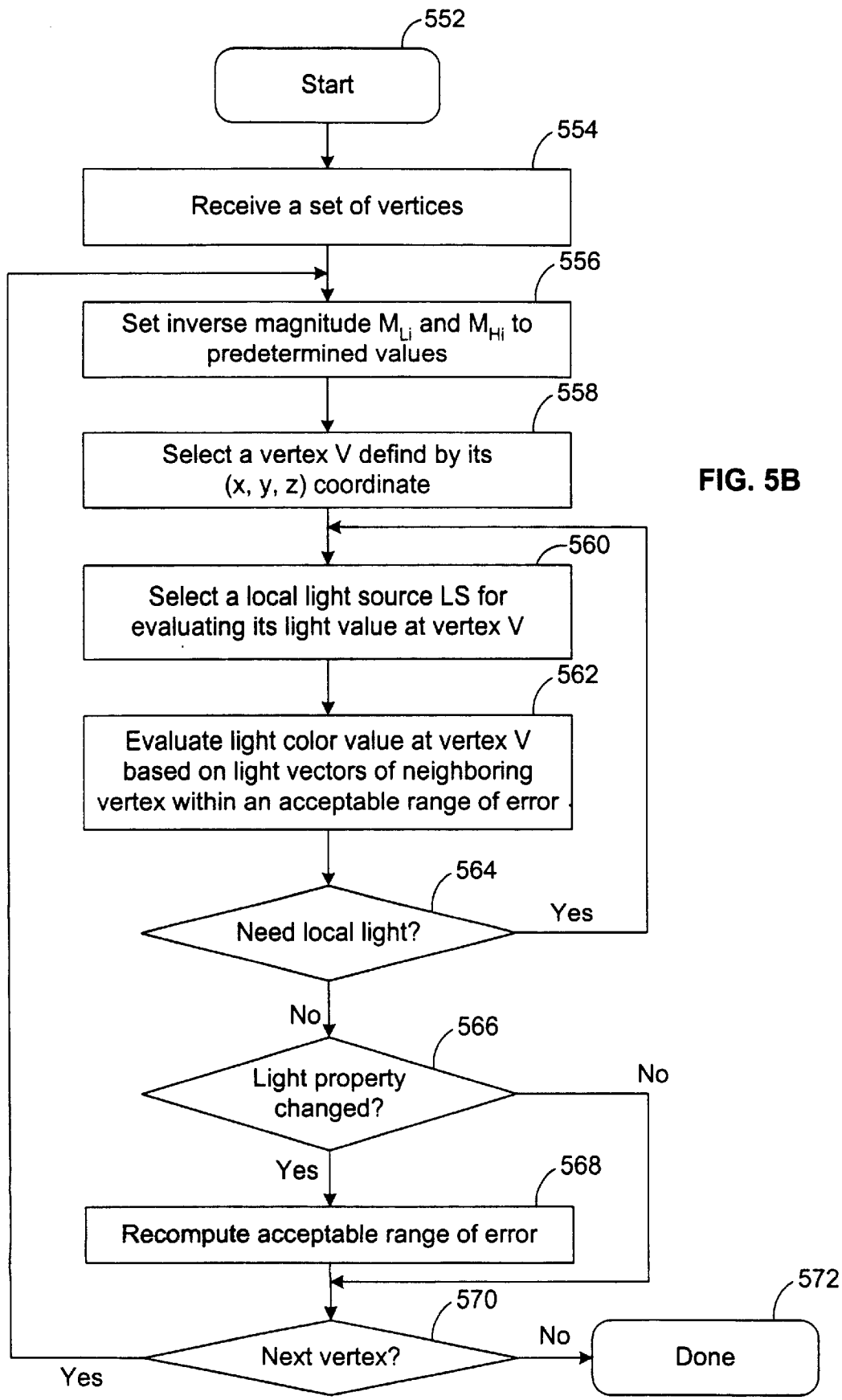
FIG. 5B is a flowchart of an exemplary method for generating light values for vertices in accordance with another embodiment of the present invention.

FIG. 5B is a flowchart of an exemplary method for generating light values for vertices in accordance with another embodiment of the present invention. The method begins in operation 552 and proceeds to operation 554 where a set of vertices is received. The vertices are characterized by (x, y, z) coordinates and are primitives or define other primitives such as polygons, lines, and the like. Then in operation 556, inverse-magnitudes $M_{Li}$ and $M_{Hi}$ are set to predetermined values. The inverse-magnitudes $M_{Li}$ and $M_{Hi}$ are used to scale light vector L and half-angle vector H, respectively. Initially, the inverse-magnitudes $M_{Li}$ and $M_{Hi}$ are both set to predetermined values of one. Then, during subsequent iteration, the inverse-magnitudes are set to values that are computed for a previous vertex.

Then in operation 558, a vertex V is selected among the set of vertices for determining its light values. As described above, the vertex V is associated with an (x, y, z) coordinate. For the selected vertex V, a local light source LS (i.e., light source not at infinity) is selected, in operation 560, for evaluating its light value contribution at the selected vertex V. The light source LS is preferably defined by a coordinate (x, y, z). Then in operation 562, light color value for the selected vertex V is computed based on inverse-magnitudes $M_{Li}$ and/or $M_{Hi}$ within an acceptable range of error. During the initial iteration, however, the light color value is determined based on the initial inverse-magnitude values of one. Then, the inverse-magnitudes are updated for a vertex for use in evaluating light values for subsequent vertices. As will be described in more detail below, the light color value is preferably determined for diffuse and/or specular component. However, the present invention may also be applied for determining other types of light color values that are described in terms of vector dot products.

After the light color value for the selected vertex has been determined for the selected local light, it is determined in operation 564 if light color value for another local light need to be determined. If so, the method proceeds back to operation 510 to select the new local light for evaluating its light contribution at the selected vertex. If not, the method proceeds to operation 566, where it is determined if the light property has changed. For example, the color of light as represented by $diffuse_{light}$ and $specular_{light}$ constants in Equation (1) may change from one vertex to another. In such cases, the acceptable range of error is recomputed in operation 568.

If the light property has not changed or after re-computing the acceptable error range, the method proceeds directly to operation 570. In operation 570, it is determined if light color value at another vertex need to be determined. If so, the method proceeds back to operation 556, where inverse-magnitudes $M_{Li}$ and $M_{Hi}$ are set to light vector values for the previous vertex. The operations 558 through 570 are then repeated until all vertices have been processed. When all vertices have been processed, the method terminates in operation 572.

Figure 6:
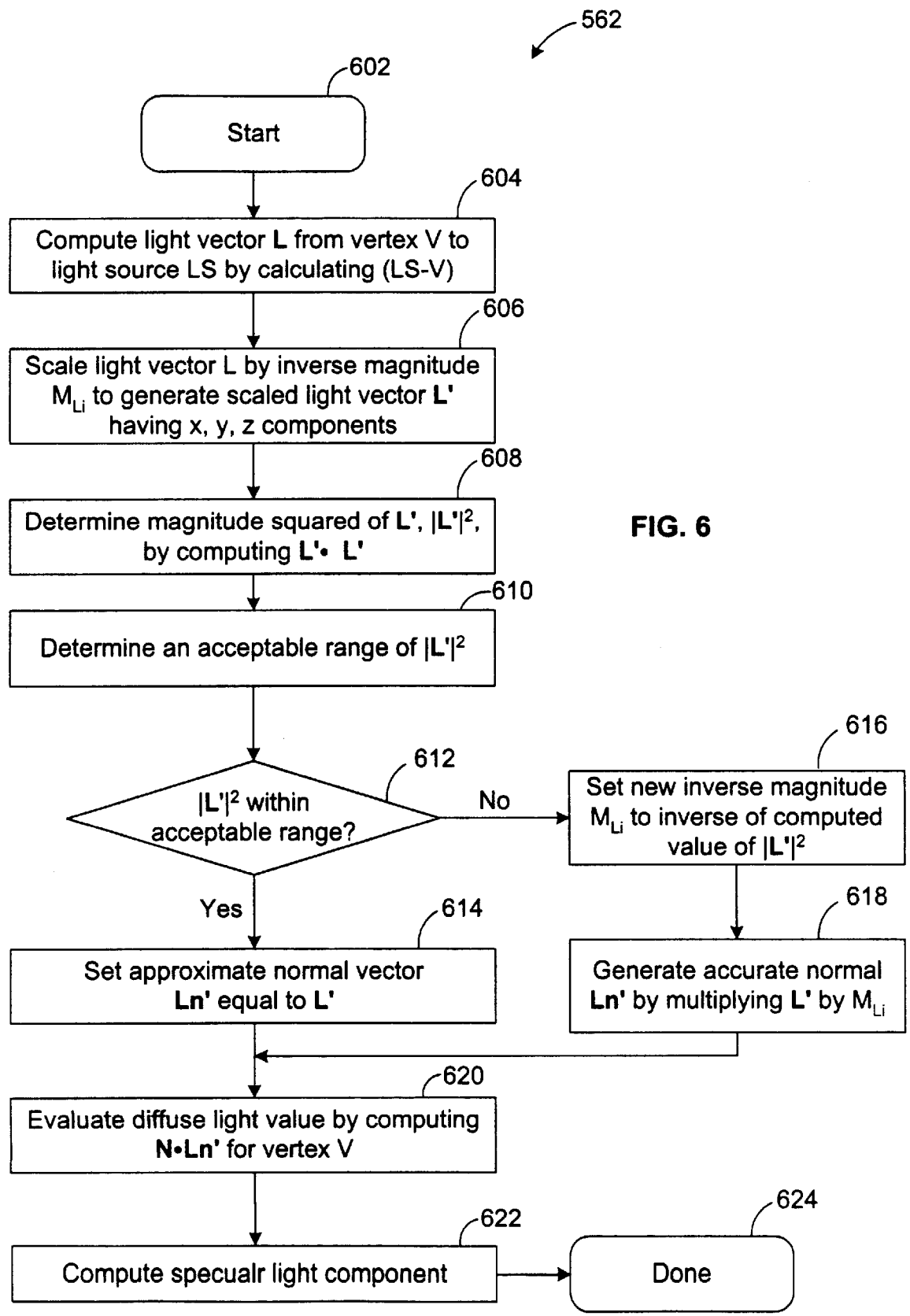
FIG. 6 shows a more detailed flowchart of a method for determining light color value at a selected vertex.

FIG. 6 shows a more detailed flowchart of the method operation 562 for determining light color value at a selected vertex. The method begins in operation 602 and proceeds to operation 604, where a light vector L from the selected vertex V to the selected light source LS is evaluated by computing (LS-V). Then, the light vector L is scaled by the inverse-magnitude $M_{Li}$ to generate scaled light vector L' having x, y, and z components. Initially, when the inverse-magnitude is one, the scaled light vector L' will be equal to the light vector L. Subsequently, however, the light vector L for the selected vertex will be scaled by updated inverse-magnitude $M_{Li}$.

After generating the scaled light vector L', the magnitude squared of the scaled vector L' is determined, in operation 608, by computing the dot product L'·L', i.e., $|L'|^2$. Then in operation 610, an acceptable error range of the magnitude squared $|L'|^2$ of the scaled light vector is determined. Next, in operation 612, it is determined if the magnitude squared $|L'|^2$ of the scaled vector is within the acceptable error range. If so, the method proceeds to operation 614, where the vector L' is set as a normalized light vector Ln', which is approximately normalized within the acceptable error range. The approximately normalized vector Ln' is then used to evaluate diffuse light value, in operation 622, by computing N·Ln' for the selected vertex V. By thus using the approximately normalized light vector as a normalized vector instead of computing the exact normalized vector, substantial amount of time and resources are saved.

However, if the magnitude squared $|L'|^2$ of the vector exceeds the error range, then the approximate normalized vector Ln' is not used. Instead, the method proceeds to operations 616 and 618 to determine the exact normalized vector Ln' having a unit length. Specifically, in operation 616, the inverse-magnitude $M_{Li}$ is updated by setting it equal to the inverse of the previously computed value of $|L'|^2$ from operation 608. By setting the inverse-magnitude $M_{Li}$ to the previously computed value of $|L'|^2$, time and resources are saved that otherwise would have been required to compute the term. Then in operation 618, the accurately normalized (i.e., unitized) light vector Ln' is computed by multiplying the approximately normalized vector L' by the newly updated inverse-magnitude $M_{Li}$. The accurately normalized light vector Ln' is then used in operation 620 to evaluate diffuse light value by computing N·Ln' for the selected vertex V in accordance with a lighting equation such as Equation (1). After the diffuse light value has been evaluated, the specular light value is computed in operation 622. Then the method terminates in operation 624.

Figure 7:
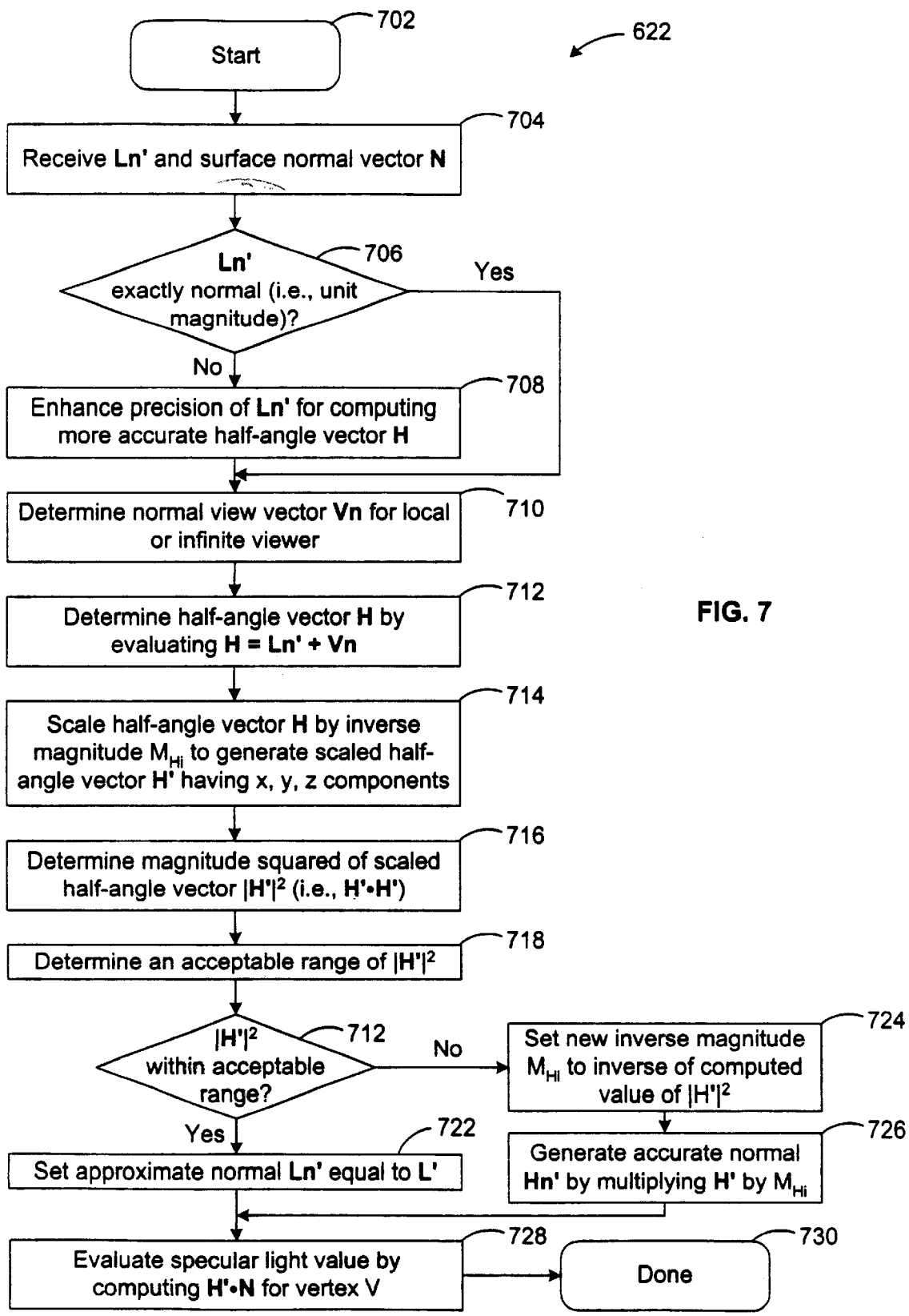
FIG. 7 illustrates a more detailed flowchart of a method for evaluating the specular light value in accordance with one embodiment of the present invention.

FIG. 7 illustrates a more detailed flowchart of the method operation 620 for evaluating the specular light value in accordance with one embodiment of the present invention. The method begins in operation 702 and proceeds to operation 704, where the normalized light vector Ln' (either approximate or accurate normalized vector) and the surface normal vector N at the selected vertex are received. Then in operation 706, it is determined if the normalized light vector Ln' is approximately or exactly normalized, i.e., of unit magnitude. If the normalized light vector Ln' is only approximately normalized, then the precision of the approximately normalized vector Ln' is enhanced for computing a more accurate half-angle vector H. In one embodiment, the precision is enhanced by setting the magnitude of Ln' equal to 0.5+(Ln'·Ln'*0.5). This enhancement allows a more accurate evaluation of the direction of the half-angle vector H.

After enhancing the precision of the approximately normalized vector Ln' or if Ln' is exactly normalized, a normalized view vector Vn is evaluated for local or infinite viewer in operation 710. For local viewer, the normalized view vector Vn is evaluated by first computing the distance between the vertex and the local viewer for each component in a manner similar to computing the light vector V in operation 604 and then normalizing the vector. On the other hand, for a viewer at infinity, the normalized view vector Vn is typically given.

Once the normalized view vector Vn has been obtained, the half-angle vector H is determined by a vector addition. For example, the half-angle vector H is obtained by adding the normalized light vector Ln' and the normalized view vector Vn. Then in operation 714, the half-angle vector H is scaled by the inverse-magnitude $M_{Hi}$ to generate a scaled half-angle vector H' having x, y, and z components.

In operation 716, the magnitude squared of the scaled vector H' is determined by computing the dot product H'·H', i.e., $|H'|^2$. Then in operation 718, an acceptable error range of the magnitude squared $|H'|^2$ of the scaled half-angle vector is determined. Next, in operation 720, it is determined if the magnitude squared $|H'|^2$ of the scaled half-angle vector is within the acceptable error range. If so, the method proceeds to operation 722, where the vector H' is set as a normalized light vector Hn', which is approximately normalized within the acceptable error range. The approximately normalized vector Hn' is then used to evaluate specular light value, in operation 728, by computing H'·N for the selected vertex V using the approximately normalized vector H'. By thus using the approximately normalized vector H' as a normalized vector instead of computing the exact normalized vector, substantial amount of time and resources are further saved.

If the magnitude squared of the vector $|H'|^2$ exceeds the error range, however, then the approximately normalized vector Hn' is not used. Instead, the method proceeds to operations 724 and 726 to determine the exact normalized vector Hn' having a unit length. Specifically, in operation 724, the inverse-magnitude $M_{Hi}$ is updated by setting it equal to the inverse of the previously computed value of $|H'|^2$ from operation 716. By thus setting the inverse-magnitude $M_{Hi}$ to the previously computed value of $|H'|^2$, substantial time and resources are saved that otherwise would have been required to compute the term. Then in operation 726, the accurately normalized half-angle vector Hn' is generated by multiplying the approximately normalized vector H' by the newly updated inverse-magnitude $M_{Hi}$. The accurately normalized half-angle vector Hn' is then used in operation 728 to evaluate specular light value by computing $(N \cdot Hn')^s$ for the selected vertex V in accordance with a lighting equation such as Equation (1). After the specular light value has been evaluated, the method terminates in operation 730.

Figure 8:
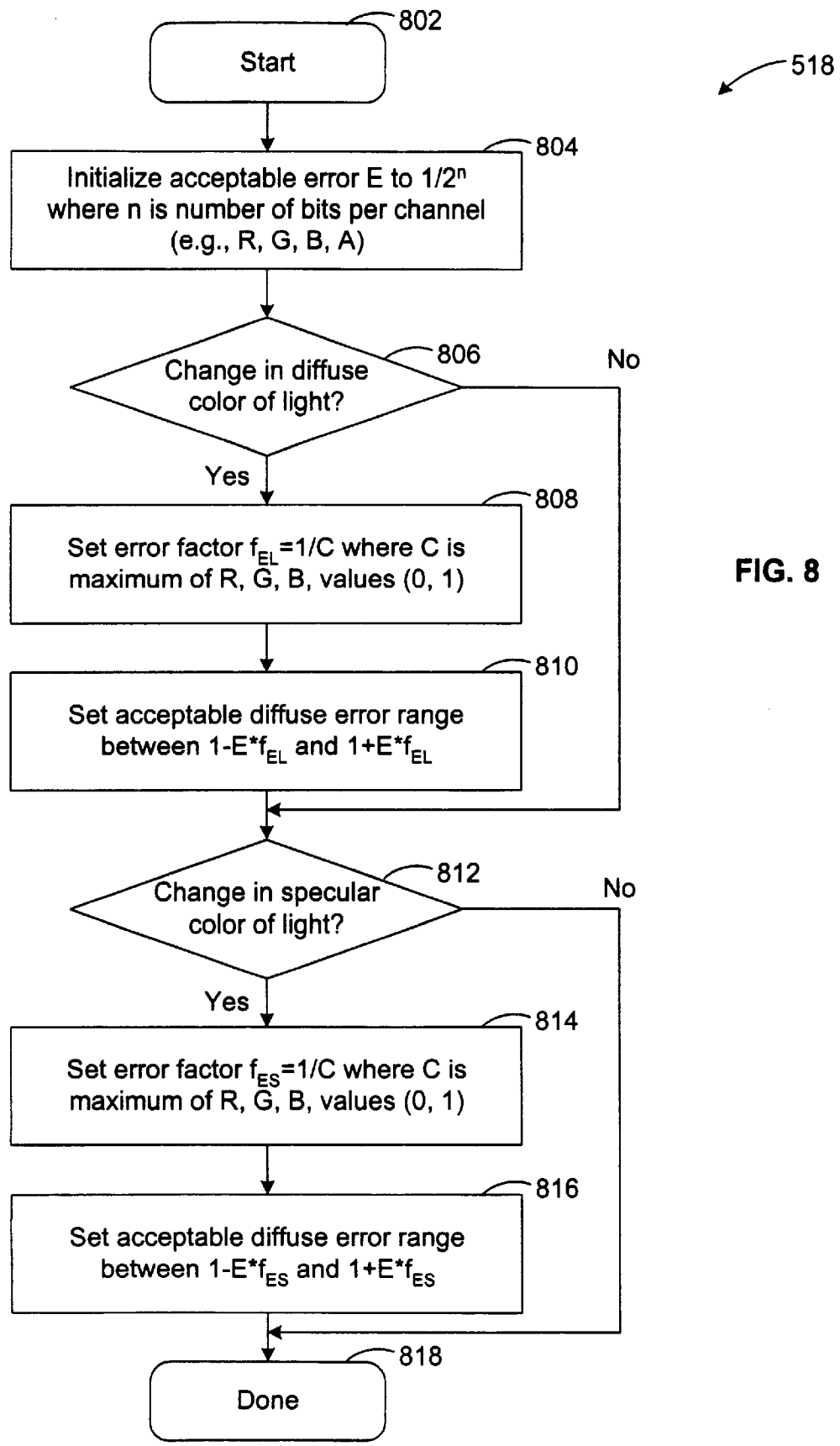
FIG. 8 shows a more detailed flowchart of a method for determining acceptable range of error in accordance with one embodiment of the present invention.

The acceptable error range may be determined between a minimum and maximum threshold values such that the L and H vector approximations do not lead to degradation in image quality. FIG. 8 shows a more detailed flowchart of the method operation 518 for determining acceptable range of error in accordance with one embodiment of the present invention. The method shown in FIG. 8 may also be used to compute acceptable diffuse and specular error ranges shown above in operations 610 and 718, respectively.

The method begins in operation 802 and proceeds to operation 804, where acceptable error E is initialized to $1/2^n$ where n is the number of bits for each channel. For example, if each of the channels R, G, B, and A has 8 bits, then the acceptable error E is initialized to 1/255. This means that the 8:8:8:8 RGBA visual channels would permit an error of up to 1/255 for each color channel. In this configuration, the acceptable image quality is maintained so long as the resulting color evaluated from the approximating vectors does not change the resulting vertex color by more than $1/2^n$ for each color channel.

The current embodiment sets acceptable diffuse error range when there has been a change in diffuse color of light. Specially, in operation 806, it is determined if there is a change in diffuse color of light. The change in diffuse color of light, in the currently preferred embodiment, is a change in a diffuse light constant such as diffuse$_{light}$. If there is a change in diffuse color of light, then the method proceeds to operation 808, where a diffuse error factor $f_{EL}$ is set to 1/C where C is the maximum of specified RGB values. For example, if RGB values are defined in an interval (0,1), then C is 1 and the error factor $f_{EL}$ is 1. After the diffuse error factor $f_{EL}$ and the acceptable error E have been obtained, the acceptable diffuse error range is determined and set in operation 810. Preferably, the acceptable diffuse error range is symmetrically set between a minimum threshold value of $1-E^*f_{EL}$ and a maximum threshold value of $1+E^*f_{EL}$. However, if there has been no change in color of light, the diffuse error range is not recomputed. In this case the method proceeds directly to operation 812 to evaluate acceptable specular error range.

The acceptable specular error range is determined in a similar manner. Specifically, in operation 812, it is determined if there is a change in specular color of light. For example, the change in specular light constant such as specular$_{light}$ manifests a change in the specular color of light. In such instance, the method proceeds to operation 814, where a specular error factor $f_{ES}$ is set to 1/C where C is the maximum of specified RGB values. After the specular error factor $f_{ES}$ and the acceptable error E have been obtained, the acceptable specular error range is determined and set in operation 816. In the preferred embodiment, the acceptable specular error range is symmetrically set between a minimum threshold value of $1-E^*f_{EL}$ and a maximum threshold value of $1+E^*f_{ES}$. However, if there has been no change in specular color of light, the error range is not recomputed. The method then terminates in operation 818.

The present invention, a method and system for generating light values for a set of vertices, is thus described. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. In a computer graphics system, a method for generating light values for a set of vertices describing a geometric object to be rendered by the computer graphics system, comprising:

receiving the set of vertices, each vertex having a coordinate and being associated with one or more vectors for evaluating a light value;

selecting a vertex from the set of vertices for computing a light value at the selected vertex, the light value at the selected vertex being associated with a light source having a coordinate;

scaling a selected vector for the selected vertex by an inverse magnitude value of a corresponding vector that is associated with a neighboring vertex, the selected vector being scaled to generate an approximately normalized vector for the selected vector; and evaluating the light value at the selected vertex using the approximately normalized vector such that an accurate normalized vector need not be computed for the selected vertex when the approximately normalized vector is determined to be within an acceptable error range.

2. The method as recited in claim 1, wherein the operation of evaluating the light value at the selected vertex comprises:

determining an acceptable error range for the approximately normalized vector;

determining whether the approximately normalized vector is within the acceptable error range; and evaluating the light value at the selected vertex using the approximately normalized vector when the approximately normalized vector is determined to be within the acceptable error range.

3. The method as recited in claim 2, further comprising:

when the approximately normalized vector is not within the acceptable error range, determining the accurate normalized vector; and evaluating the light value at the selected vertex using the accurate normalized vector.

4. The method as recited in claim 1, wherein each vertex is associated with a light vector L and a normal vector N for generating a diffuse light value, wherein the light vector L is scaled to generate the approximately normalized vector.

5. The method as recited in claim 1, wherein each vertex is associated with a half-angle vector H and a normal vector N for generating a specular light value, wherein the half-angle vector H is scaled to generate the approximately normalized vector.

6. The method as recited in claim 3, wherein the approximately normalized vector is A, wherein the operation of determining the accurate normalized vector comprises:

setting a new inverse-magnitude equal to $1/\{|A \cdot A|\}^{1/2}$; and generating the accurate normalized vector by multiplying the approximately normalized vector A by the new inverse-magnitude.

7. The method as recited in claim 1, wherein the vertices are pixels and the light values are generated for the pixels based on one or more vectors of the neighboring pixels.

8. The method as recited in claim 2, wherein the acceptable error range is defined in terms of the number of bits per color channel.

9. The method as recited in claim 8, wherein the acceptable error range is defined between a minimum threshold value of $1-(1/2^n)/C$ and a maximum threshold value of $1+(1/2^n)/C$, where n is the number of bits per color channel and C is a maximum color channel value.

10. In a computer graphics system, a method for generating a normalized vector for a first vector at a given position based on a second vector at a neighboring position for use in rendering graphics images in the computer graphics system, the method comprising:

determining an inverse-magnitude of the second vector;

scaling the first vector at the given position by the inverse-magnitude of the second vector to generate an approximately normalized vector A for the first vector;

determining whether the approximately normalized vector A is within the acceptable error range;

if the approximately normalized vector A is within the acceptable error range, using the approximately normalized vector A as the normalized vector for the first vector, and if the approximately normalized vector A is not within the acceptable error range, evaluating an accurate normalized vector and using the accurate normalized vector as the normalized vector for the first vector.

11. The method as recited in claim 10, wherein the operation of determining whether the approximately normalized vector A is within the acceptable error range comprises:

determining a magnitude squared $|A|^2$ of the approximately normalized vector A by computing a dot product $A \cdot A$; and comparing the magnitude squared $|A|^2$ with the acceptable error range to determine whether the magnitude squared $|A|^2$ is within the acceptable error range.

12. The method as recited in claim 10, wherein the operation of determining the accurate normalized vector comprises:

setting a new inverse-magnitude equal to $1/\{|A \cdot A|\}^{1/2}$;

generating the accurate normalized vector by multiplying the approximately normalized vector A by the new inverse-magnitude; and updating the inverse-magnitude with the new inverse-magnitude.

13. The method as recited in claim 10, wherein each of the positions is a pixel that has an associated light vector L and an associated normal vector N for generating a diffuse light value, wherein the associated light vector L is scaled to generate the approximately normalized vector.

14. The method as recited in claim 10, wherein each of the positions is a pixel that has an associated half-angle vector H and an associated normal vector N for generating a specular light value, wherein the associated half-angle vector H is scaled to generate the approximately normalized vector.

15. The method as recited in claim 10, wherein each of the positions is a vertex that has an associated light vector L and an associated normal vector N for generating a diffuse light value, wherein the associated light vector L is scaled to generate the approximately normalized vector.

16. The method as recited in claim 10, wherein each of the positions is a vertex that has an associated half-angle vector H and an associated normal vector N for generating a specular light value, wherein the associated half-angle vector H is scaled to generate the approximately normalized vector.

17. A computer graphics system for generating light values for a set of vertices, the vertices describing a model to be rendered by the computer graphics system, the system comprising:

a processor coupled to a bus;

a memory coupled to the bus;

a storage device coupled to the bus;

means for receiving a set of vertices describing a geometric object, each vertex being associated with one or more vectors for evaluating a light value;

means for selecting a vertex from the set of vertices for computing a light value at the selected vertex, wherein the light value at the selected vertex is associated with a light source having a coordinate;

means for scaling a selected vector for the selected vertex by an inverse magnitude value of a corresponding vector that is associated with a neighboring vertex, wherein the selected vector is scaled to generate an approximately normalized vector for the selected vector; and means for evaluating the light values at the selected vertex using the approximately normalized vector such that an accurate normalized vector need not be computed for the selected vertex.

18. The system as recited in claim 17, wherein the light value is evaluated at the selected vertex by:

determining an acceptable error range for the approximately normalized vector;

determining whether the approximately normalized vector is within the acceptable error range; and evaluating the light value at the selected vertex using the approximately normalized vector when the approximately normalized vector is determined to be within the acceptable error range.

19. The system as recited in claim 18, wherein when the approximately normalized vector is not within the acceptable error range, the accurate normalized vector is determined and the light value is evaluated at the selected vertex using the accurate normalized vector.

20. The system as recited in claim 17, wherein each vertex is associated with a light vector L and a normal vector N for generating a diffuse light value, wherein the light vector L is scaled to generate the approximately normalized vector.

21. The system as recited in claim 17, wherein each vertex is associated with a half-angle vector H and a normal vector N for generating a specular light value, wherein the half-angle vector H is scaled to generate the approximately normalized vector.

22. The system as recited in claim 19, wherein the approximately normalized vector is A and wherein the accurate normalized vector is determined by:

setting a new inverse-magnitude equal to $1/\{|A \cdot A|\}^{1/2}$; and generating the accurate normalized vector by multiplying the approximately normalized vector A by the new inverse-magnitude.

* * * * *

UNITED STATES PATENT AND TRADEMARK OFFICE
CERTIFICATE OF CORRECTION

PATENT NO.    : 6,504,538 B1
DATED         : January 7, 2003
INVENTOR(S)   : Jason L Freund et al.

It is certified that error appears in the above-identified patent and that said Letters Patent is hereby corrected as shown below:

Column 5,
Line 54, delete "evaluate" and insert -- evaluates -- therefor;

Column 6,
Line 22, delete "arc" and insert -- are -- therefor;

Column 10,
Line 64, delete "maximum 1-E*$f_{EL}$" and insert -- maximum 1-E*$f_{ES}$ -- therefor.

Signed and Sealed this

Twelfth Day of August, 2003

JAMES E. ROGAN
*Director of the United States Patent and Trademark Office*